US007028934B2

(12) United States Patent
Burynski, Jr. et al.

(10) Patent No.: US 7,028,934 B2
(45) Date of Patent: Apr. 18, 2006

(54) VERTICAL ROLLER MILL WITH IMPROVED HYDRO-PNEUMATIC LOADING SYSTEM

(75) Inventors: Raymond M. Burynski, Jr., Bethlehem, PA (US); Jason S. Euculano, Bethlehem, PA (US)

(73) Assignee: F. L. Smidth Inc., Bethlehem, PA (US)

( * ) Notice: Subject to any disclaimer, the term of this patent is extended or adjusted under 35 U.S.C. 154(b) by 33 days.

(21) Appl. No.: 10/631,075

(22) Filed: Jul. 31, 2003

(65) Prior Publication Data

US 2005/0023390 A1 Feb. 3, 2005

(51) Int. Cl.
*F16D 31/02* (2006.01)

(52) U.S. Cl. ...................... 241/121; 241/117; 241/118; 241/119; 241/120; 60/413; 60/414; 60/415; 60/416

(58) Field of Classification Search ................ 241/117, 241/118, 119, 120, 121; 60/413, 414, 415, 60/416

See application file for complete search history.

(56) References Cited

U.S. PATENT DOCUMENTS

| | | | | |
|---|---|---|---|---|
| 4,389,767 | A * | 6/1983 | Burbach | 29/527.1 |
| 4,485,974 | A * | 12/1984 | Lass | 241/30 |
| 2004/0050042 | A1* | 3/2004 | Frazer | 60/413 |

* cited by examiner

*Primary Examiner*—Derris H. Banks
*Assistant Examiner*—Jason Y. Pahng
(74) *Attorney, Agent, or Firm*—Daniel De Joseph

(57) ABSTRACT

An accumulator assembly comprising at least two accumulators that are hydraulically interconnected to the same source of hydraulic fluid. Each accumulator containing an energy absorbing medium which is compressible when a movable barrier which separates the hydraulic fluid from the energy absorbing medium is acted upon by an increase in pressure of the hydraulic fluid. When the assembly contains two accumulators, one accumulator contains a compressibility limiter which interrupts the compressibility of the energy absorbing medium within the accumulator and the other accumulators does not contain a compressibility limiter so that the energy absorbing media therein may be fully compressed by the hydraulic fluid. The accumulator assembly is favorably utilized in a vertical roller mill.

13 Claims, 5 Drawing Sheets

VERTICAL ROLLER MILL WITH IMPROVED HYDRO-PNEUMATIC LOADING SYSTEM

BACKGROUND OF THE INVENTION

Vertical roller mills, especially those common for grinding of cement raw materials, typically employ a hydraulic-pneumatic system to apply a grinding force to the material bed. During operation, these systems will contain pressurized hydraulic fluid in an isolated branch of the circuit consisting principally of cylinders and accumulators. This trapped pressure, along with the cylinder and accumulators, creates a hydraulic "spring". The hydraulic spring serves two purposes. First, it provides the grinding force to the rollers for the purpose of comminution. Second, it acts as a suspension system so the grinding rollers can accommodate changes in material depth and strength.

Typical vertical roller mill geometry has the rod side of the cylinder pressurized to create the grinding force. Various possibilities exist for the piston side. Some systems have non-pressurized oil which freely flows between the cylinder and tank. Other systems have means to evacuate this area, and operate with a partial vacuum. A third type, relevant to this invention, employs pressurized oil on the piston side. These counter-pressure hydraulic systems for vertical roller mills are well known in the cement industry. Pressurization of the piston side, at a much lower level than on the rod side, has been demonstrated to improve operational stability of vertical mills grinding cement raw materials.

During normal grinding, it is desirable to have a relatively flat force-displacement curve, i.e., a soft hydraulic spring. This softness, or low spring stiffness, contributes to maintaining a low mill vibration level. However, to prevent potentially damaging mill vibration or tire-to-table contact, the grinding force should be reduced or even removed completely if the material bed becomes unstable. This cushioning effect (that is, a decrease in grinding force at low bed depths) is one of the major benefits of counter pressure systems.

In traditional counter pressure systems, the cushion effect comes at the expense of increasing system stiffness. FIG. 1 illustrates force displacement curves A–D in such traditional counter pressure systems utilized in a roller mill. Since the cushion effect is directly proportional to the counter pressure magnitude, as the cushion effect is increased, that is, as one goes from the system depicted in curve A toward the system depicted in curve D, the system stiffness, or steepness of the force displacement curve, is also increased. It is one object of the invention, therefore, to eliminate the need to make trade offs between system stiffness and cushion effect.

DETAILED DESCRIPTION OF THE INVENTION

Figure 1:
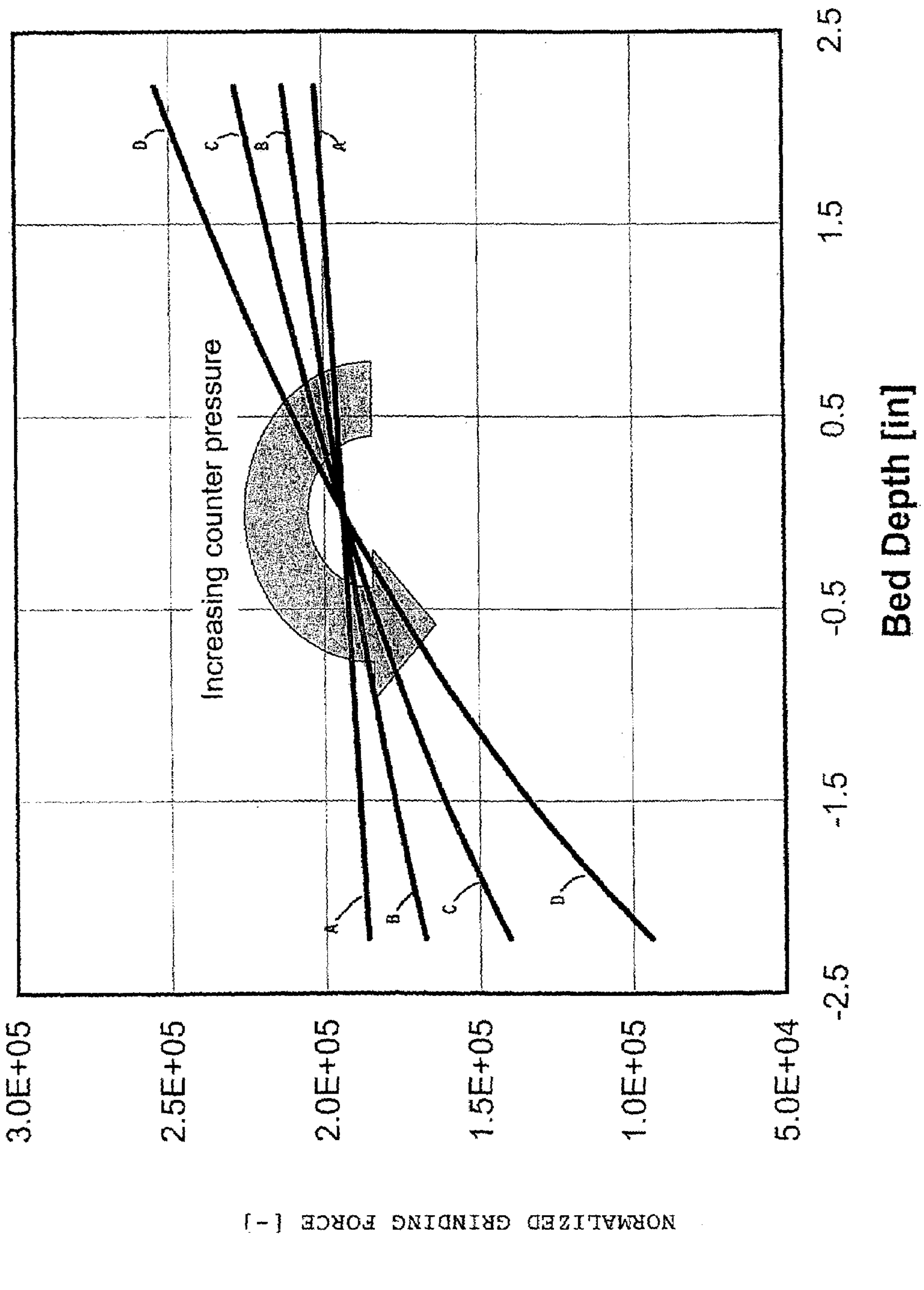
FIG. 1 is a graph showing the force displacement curve in a traditional counter pressure system utilized in a roller mill.
Figure 2:
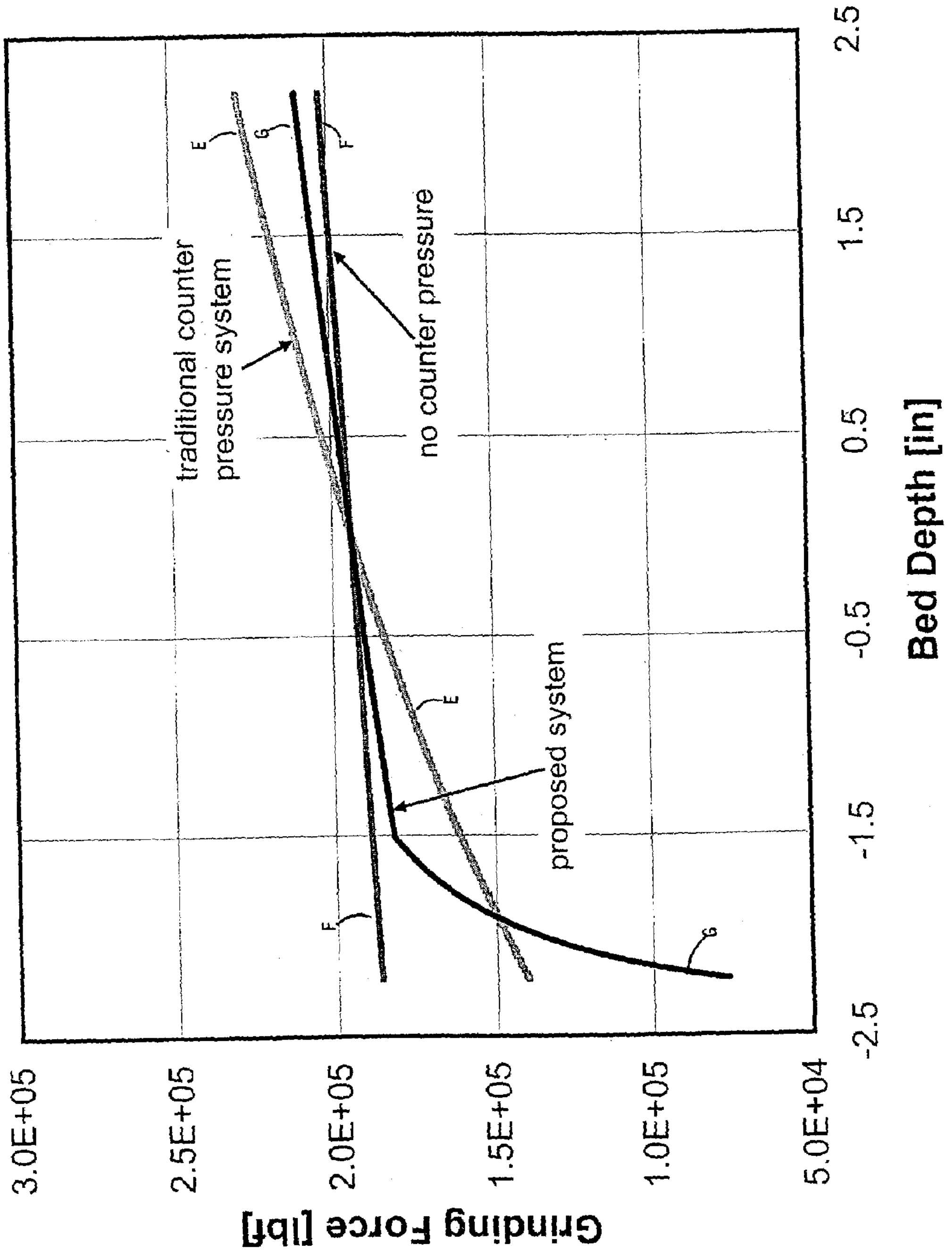
FIG. 2 is a graph showing a comparison of the force displacement curve in a traditional counter pressure system utilized in a roller mill, a roller mill system which utilizes no counter pressure, and the system of the present invention.
Figure 3:
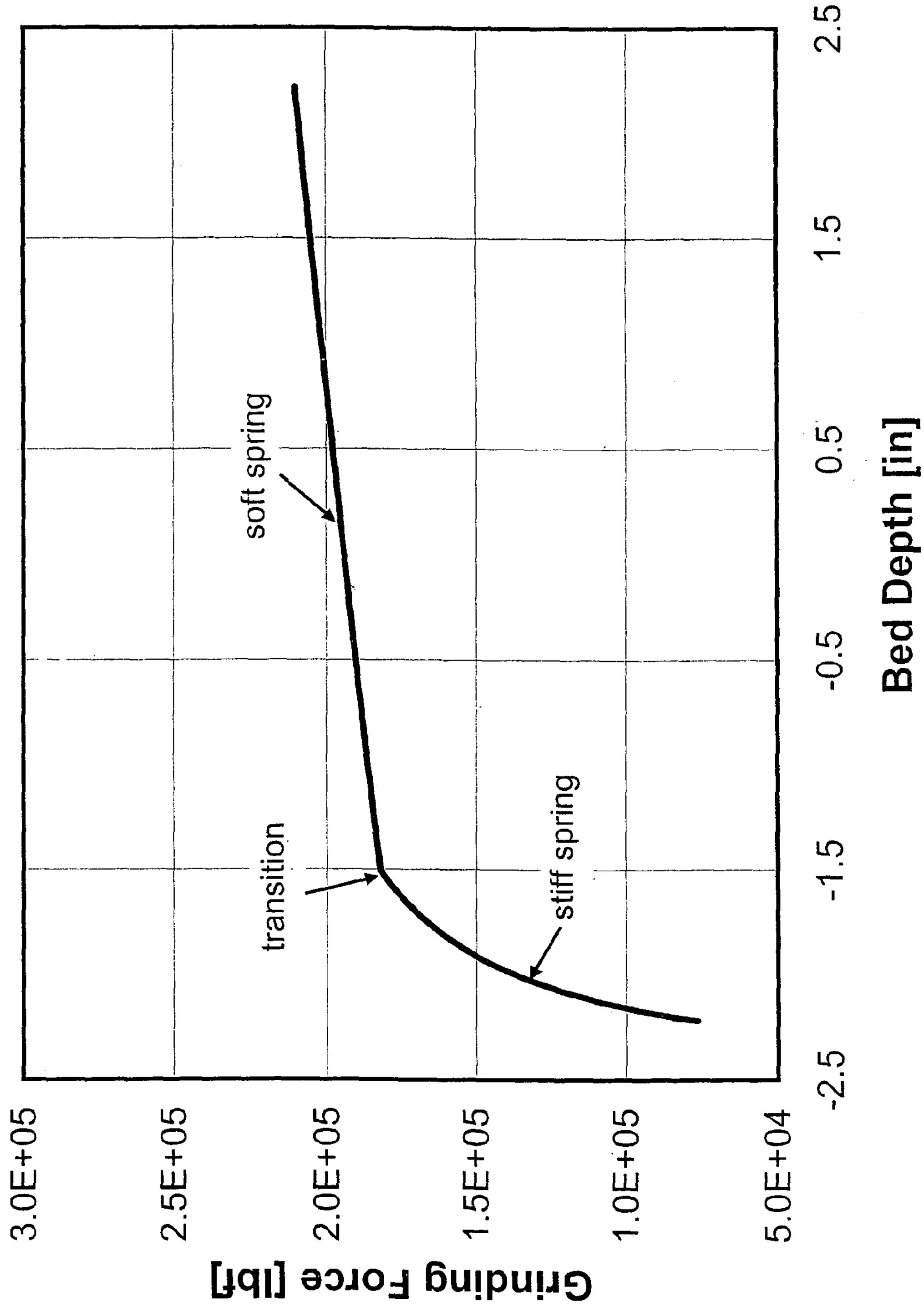
FIG. 3 is a graph showing the force displacement curve in the system of the present invention which illustrates respective values at various points in the system.

FIG. 2 illustrates the force displacement curves of the traditional, prior art, counter pressure system (curve E) a system in which there is no counter pressure (curve F) and the proposed system of the present invention (curve G). FIG. 3 displays the force displacement curves of the proposed system at various points in the system, as will be explained in more detail below.

By utilizing the accumulator system of the present invention, it is possible to create a hydraulic spring suspension with a transition point. This point defines a material bed level below which there is substantial risk for either high vibration or tire-to-table contact. For material bed depths greater than the transition point, the hydraulic spring is soft. When the material bed is lower than the transition point, the hydraulic spring becomes progressively stiffer, partially relieving the net grinding force and inhibiting both vibration and tire-to-table contact.

The present invention describes a system of accumulators to achieve the desired effect. While it is possible to realize such spring characteristics in other ways, these systems require additional valves, transducers, or other components. The proposed system can, using a novel arrangement of accumulators, provide improved cushioning effect without the drawbacks of either complex hydraulics or increased system stiffness.

Figure 4:
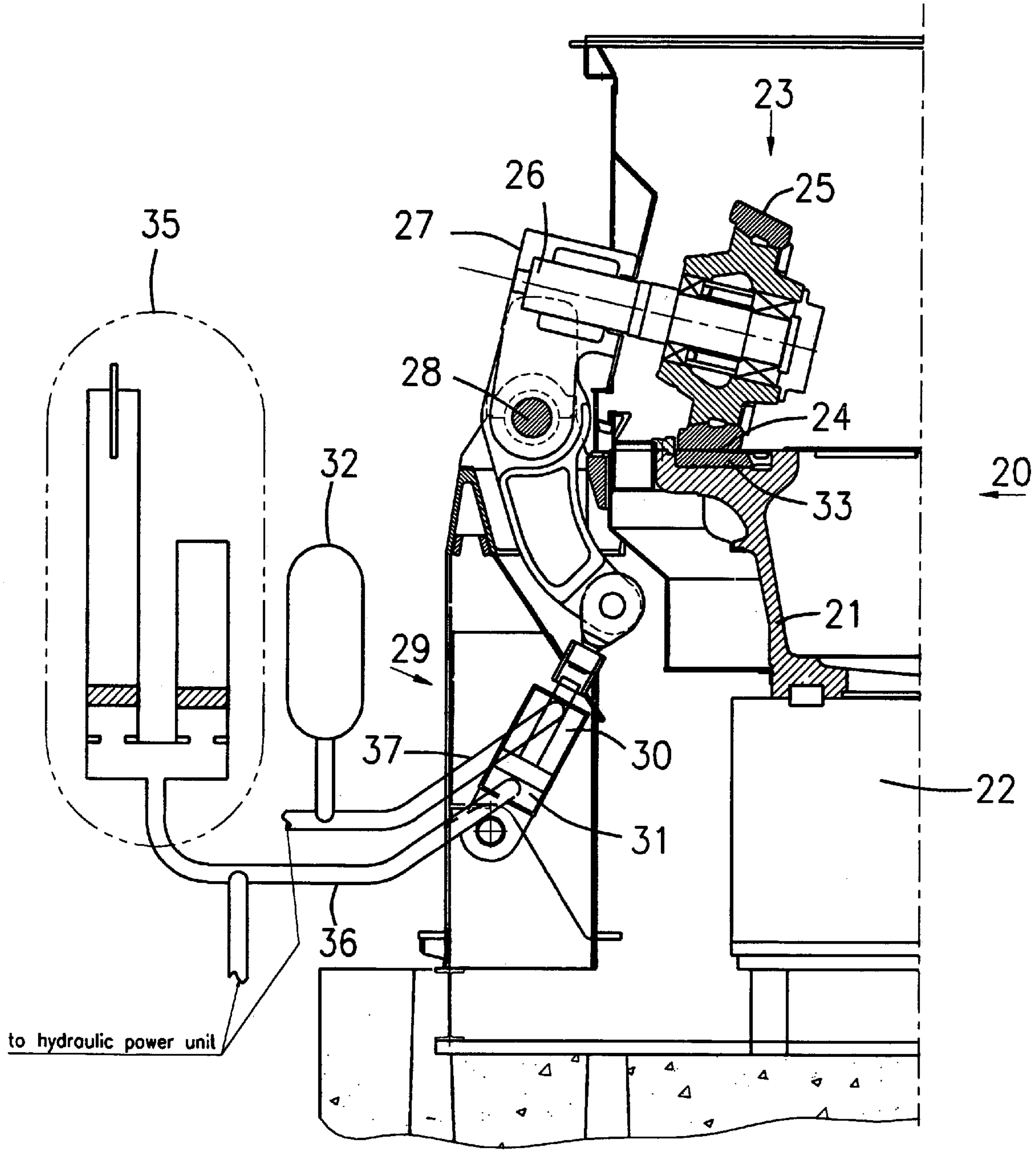
FIG. 4 illustrates a portion of a roller mill of the present invention in which there is depicted the use of an accumulator assembly of the present invention.

With reference to FIG. 4, the various parts of which are not necessarily drawn to scale, the vertical roller mill 20 of the present invention comprises rotating table 21, supported by gearbox 22 which is powered by an electric motor (not shown). Material is fed to the center of table 21. A plurality of grinding rollers 23, only one of which is depicted in FIG. 4, are equally spaced about table 21. Each grinding roller 23 includes tire 25, which is free to turn about axle 26. Axle 26 is held by lever 27, which pivots on shaft 28. The grinding force is created by hydraulic cylinder 29, attached to the lever 27. A hydraulic power unit (not shown) provides and maintains pressurized fluid to both the rod side 30 and piston side 31 of the cylinder.

Due to the centrifugal force of rotating table 21, the material is distributed to rollers 23, where it forms a grinding bed 24 which is ground between roller tire 25 and table liners 33.

Accumulator assembly 35, which is the assembly of the present invention, is connected by hydraulic fluid conduit 36 to piston side 31 of cylinder 29. Optional standard accumulator 32 is connected by hydraulic fluid conduit 37 to rod side 30 of cylinder 29. Both accumulator assembly 35 and standard accumulator 32 serve to store and supply pressurized fluid to and from the cylinder 29 as it moves in response to the material grinding bed fluctuations. The accumulators are typically precharged with gas, typically an inert gas that is preferably nitrogen, for energy storage, that is, as an energy absorbing medium, but mechanical energy absorbing media such as mechanical springs or other energy storage mechanisms known in the art may be employed.

The accumulator assembly of the present invention can be connected to either or both the piston side or the rod side of the vertical roller mill's hydraulic cylinder. The accumulator assembly may be used by itself or in conjunction with a standard accumulator, as is depicted in FIG. 4.

The accumulator assembly of the present invention comprises at least two accumulators that are hydraulically interconnected to the same source of hydraulic fluid. Each accumulator contains an energy absorbing medium. The medium is compressible when a movable barrier which separates the hydraulic fluid from the energy absorbing medium is acted upon by an increase in pressure of the hydraulic fluid.

At least one of the accumulators in the accumulator assembly of the present invention contains a compressibility limiter which interrupts the compressibility of the energy absorbing medium within the accumulator. That is, through the use of the compressibility limiter the compressibility of the medium is stopped at less than its natural state of compression. At least one of the accumulators in the accumulator assembly of the present invention does not contain a compressibility limiter so that the energy absorbing media therein may be fully compressed to its natural state by the hydraulic fluid. Thus, if there are only two accumulators in the accumulator assembly of the present invention one must contain a compressibility limiter and the other one must not.

Typically, the movable barrier in the accumulator that contains a compressibility limiter is a movable piston which, when acted upon by an increase in pressure of the hydraulic fluid, moves and compresses the energy absorbing medium. Alternatively the movable barrier can be a diaphragm or a bladder.

Figure 5:
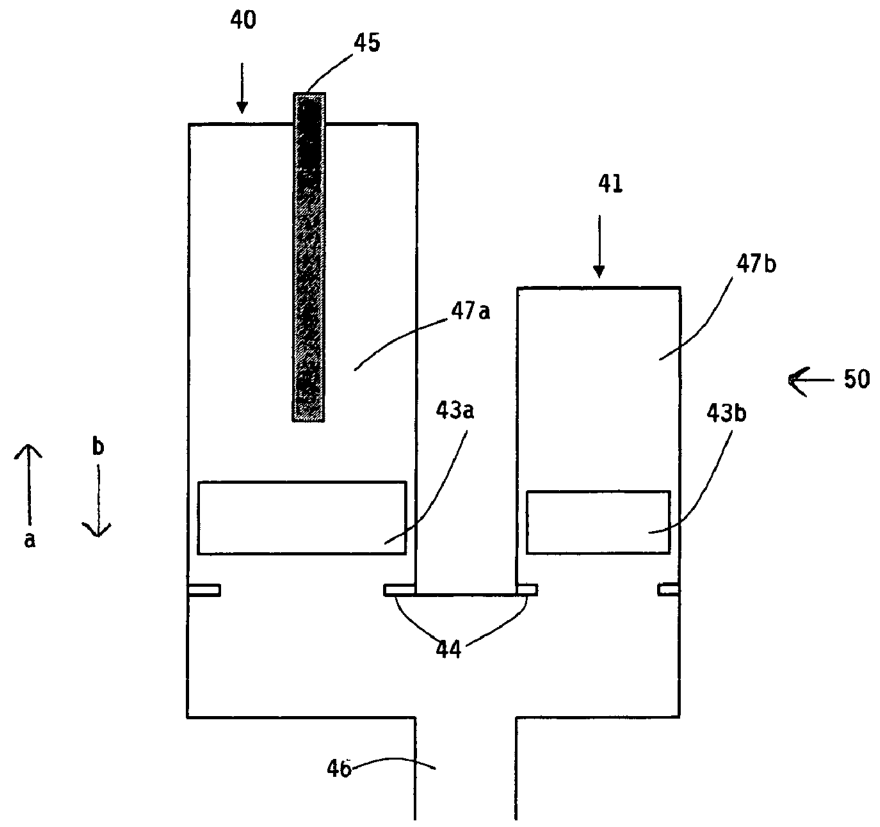
FIG. 5 is a more detailed illustration of an accumulator assembly of the present invention.

FIG. 5 depicts one embodiment of an accumulator assembly 50 of the present invention. The assembly contains a first accumulator 40 and a second accumulator 41, which are both depicted as being a piston style, having movable pistons 43*a* and 43*b*. Both pistons can move in the direction specified by arrow a (when there is an increase in hydraulic pressure) or arrow b (when there is a decrease in hydraulic pressure). When each piston moves in the direction specified by arrow a they thereby compress gas located in compartments 47*a* and 47*b*. First accumulator 40 contains compressibility limiter 45, which in this instance in a piston stroke limiter which serves to limit the stroke of piston 43*a* in the direction of travel indicated by arrow a and thereby interrupt the compressibility of gas located in compartment 47*a*. Compressibility limiter 45 can have many forms. Preferably it is externally adjustable, which is the version depicted in FIG. 5, wherein compressibility limiter 45 can move in the direction specified by arrow a or arrow b. In another embodiment, compressibility limiter 45 can be an internal retainer set in a fixed position. As depicted in FIG. 5, first accumulator 40 has a larger internal volume than second accumulator 41. This is an optional embodiment.

A second accumulator 41, which can be any style, must also be present in accumulator assembly 50. The second accumulator 41 must allow the gas located in compartment 47*b* to be freely compressed, i.e., no limiter as described for first accumulator 40 may be present. Accumulator assembly 50 may have more than two accumulators, with each additional accumulator being chosen from a version of an accumulator which contains a compressibility limiter or one that does not.

Accumulator assembly 50 operates as follows (this is in reference to the depicted embodiment when accumulator assembly 50 is as depicted, i.e. attached to piston side 30 of hydraulic cylinder 29): during normal grinding operation, there are only small variations in the material bed 24 depth. Fluid flows between the cylinder and the accumulators on the piston side (assembly 50) and rod side (accumulator 32) of hydraulic cylinder 29. The accumulators 40 and 41 in accumulator assembly 50 act jointly, sharing the displaced hydraulic fluid. Piston 43*a* in the stroke limited accumulator 40 will float between the retainers 44 and stroke limiter 45 without contacting either. The piston 43*b* in the second accumulator 41 will also move freely, and is limited only by the compressibility of gas in compartment 47*b*.

During unstable operation, there can be a sudden reduction or loss of material bed 24. Roller 23, under force of hydraulic cylinder 29, will push downward towards the table 21. This motion will push a large volume of hydraulic oil through the common manifold 46 into accumulators 40 and 41. Piston 43*a* of accumulator 40 will be forced upward until it contacts stroke limiter 45. Once the piston 43*a* contacts stroke limiter 45, accumulator 40 will no longer accept any displaced hydraulic fluid. Thus, the system's effective accumulator volume is reduced. Any and all additional oil must then flow into the second accumulator 41. The reduced effective volume results in a stiffer hydraulic spring, characterized by the steep section of the plot in FIG. 3.

Figure 6:
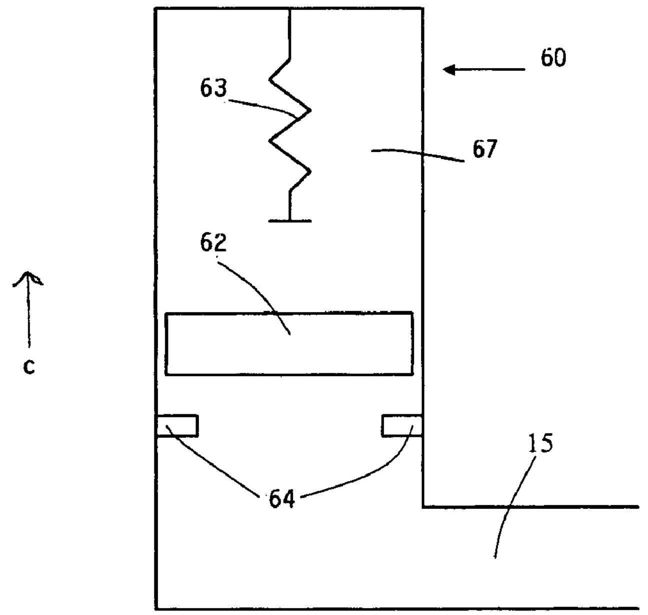
FIG. 6 depicts another embodiment of an accumulator which can be utilized in the present invention.

FIG. 6 illustrates another embodiment of the present invention, in which a single accumulator 60 replaces accumulator assembly 50. Single accumulator 60 incorporates a mechanical spring 63 or other energy absorbing device. The action is similar to the previously described system. During normal grinding, piston 62 will freely travel between piston retainers 64 and spring 63. When the piston moves in the direction of arrow c, moving from retainers 64, it will initially contact a first energy absorbing medium, in this case inert gas or nitrogen located within compartment 67. Should, as previously described, bed instability or another reason cause the grinding roller to move sharply downward, the piston 62 will move upwards in direction c and, at a later point in its travel, contact a second energy absorbing medium, in this case mechanical spring 63. At this contact point, any further upward motion will be resisted by both the second energy absorbing medium, that is, the compressed gas, and mechanical spring 63. Again, the result is a stiffer system.

This invention has the advantage of not requiring additional valves, transducers, or electronic components to achieve the desired effect.

A roller mill incorporating the system of the present invention has the further advantage that it is self-compensating for wear of the grinding components. Internal leakage is inherent to virtually all hydraulic systems. Therefore, oil must be added to the system periodically to maintain the prescribed nominal grinding pressure setpoint. This occurs on a much shorter time scale than wear of the grinding parts, that is, grinding tire 25 and table segments 33. While mechanical stoppers for limiting travel of the grinding lever are well known, these mechanical stoppers engage the roller at an absolute roller position. Wear of the grinding parts must be compensated for by adjustment of the mechanical stoppers. Through the use of the present invention, the transition point is a function solely of hydraulic pressure changes. As such, the transition point will always occur at a predetermined level below the nominal grinding bed depth. This feature eliminates the need to adjust mechanical stoppers to compensate for wear.

While there are shown and described present preferred embodiments of the invention, it is distinctly to be understood that the invention is not limited thereto, but may be otherwise variously embodied and practiced within the scope of the following claims.

We claim:

1. A vertical roller mill in which the grinding force is supplied by a hydraulic cylinder having a piston side and a rod side, wherein said roller mill contains an accumulator assembly hydraulically connected to either the piston or rod side of the hydraulic cylinder, said accumulator assembly comprising at least two accumulators being hydraulically interconnected to the same source of hydraulic fluid, each of the two accumulators containing an energy absorbing medium which is compressible when a movable barrier which separates the hydraulic fluid from the energy absorbing medium is acted upon by an increase in pressure of the hydraulic fluid, wherein at least one of said at least two accumulators contains a compressibility limiter which interrupts the compressibility of the energy absorbing medium within the accumulator and at least one of said at least two accumulators does not contain a compressibility limiter so that its energy absorbing media may be fully compressed by the hydraulic fluid.

2. The vertical roller mill of claim 1 wherein the accumulator assembly is connected to the piston side of the hydraulic cylinder.

3. The vertical roller mill of claim 1 wherein the accumulator assembly is connected to the rod side of the hydraulic cylinder.

4. An accumulator assembly comprising at least two accumulators being hydraulically interconnected to the same source of hydraulic fluid, each of the two accumulators containing an energy absorbing medium which is compressible when a movable barrier which separates the hydraulic fluid from the energy absorbing medium is acted upon by an increase in pressure of the hydraulic fluid, wherein at least one of said at least two accumulators contains a compressibility limiter which interrupts the compressibility of the energy absorbing medium within the accumulator and at least one of said at least two accumulators does not contain a compressibility limiter so that the energy absorbing media therein may be fully compressed by the hydraulic fluid.

5. The accumulator assembly of claim 4 wherein the movable barrier in the at least one accumulator containing a compressibility limiter is a movable piston which, when acted upon by an increase in pressure of the hydraulic fluid moves in a first direction to compress the energy absorbing medium.

6. The accumulator assembly of claim 4 wherein the movable barrier in the at least one accumulator containing a compressibility limiter is a diaphragm.

7. The accumulator assembly of claim 4 wherein the movable barrier in the at least one accumulator containing a compressibility limiter is a bladder.

8. The accumulator assembly of claim 4 wherein the energy absorbing medium is an inert gas.

9. The accumulator assembly of claim 8 wherein the energy absorbing medium is nitrogen.

10. The accumulator assembly of claim 4 wherein the energy absorbing medium is a spring.

11. The accumulator assembly of claim 5 wherein the compressibility limiter is a stroke limiter that stops the movement of the piston in said first direction at a predetermined point.

12. The accumulator assembly of claim 11 wherein the stroke limiter is adjustable to thereby vary the point at which the movement of the piston is stopped.

13. The accumulator assembly of claim 4 wherein the first accumulator has a larger internal volume than the second accumulator.

* * * * *